United States Patent [19]

Schlapp

[11] Patent Number: 5,299,791
[45] Date of Patent: Apr. 5, 1994

[54] ROOF CONSTRUCTION FOR VEHICLES

[75] Inventor: Albert Schlapp, Dreieich, Fed. Rep. of Germany

[73] Assignee: Rockwell Golde GmbH, Frankfurt am Main, Fed. Rep. of Germany

[21] Appl. No.: 97,933

[22] Filed: Jul. 26, 1993

Related U.S. Application Data

[63] Continuation of Ser. No. 869,261, Apr. 15, 1992, abandoned.

[30] Foreign Application Priority Data

Apr. 15, 1991 [DE] Fed. Rep. of Germany ....... 4112246

[51] Int. Cl.⁵ ............................................... B60J 7/12
[52] U.S. Cl. ...................................... 296/219; 296/216; 296/223; 160/118; 160/188; 160/206; 47/475.1; 47/476.1; 47/483.1
[58] Field of Search ............... 296/216, 219, 220, 223; 105/377; 160/118, 188, 206; 49/483.1, 475.1, 476.1

[56] References Cited

U.S. PATENT DOCUMENTS

| | | |
|---|---|---|
| 2,101,278 | 12/1937 | Wolff et al. .................. 49/483 X |
| 3,045,631 | 7/1962 | Stransky .................. 160/188 X |
| 4,210,359 | 7/1980 | Mori .................. 296/222 |
| 4,210,361 | 7/1980 | Marvin et al. .................. 296/219 X |
| 5,031,959 | 7/1991 | Queveau .................. 296/216 X |
| 5,039,161 | 8/1991 | Schmidhuber .................. 49/483.1 |
| 5,054,846 | 10/1991 | Simon et al. .................. 296/218 |

FOREIGN PATENT DOCUMENTS

| | | |
|---|---|---|
| 911376 | 5/1954 | Fed. Rep. of Germany ..... 49/483.1 |
| 1503928 | 10/1967 | France .................. 296/219 |
| 155125 | 7/1987 | Japan .................. 296/220 |
| 165013 | 1/1934 | Switzerland .................. 296/219 |
| 404912 | 1/1934 | United Kingdom .................. 296/216 |

Primary Examiner—Dennis H. Pedder
Attorney, Agent, or Firm—Anderson Kill Olick & Oshinsky

[57] ABSTRACT

A roof construction for vehicles, especially limousines, delivery trucks, mini buses, caravans or the like, with a roof aperture elongated in the vehicle traveling direction, and a multipart lid includes lid parts articulated with each other to form one half of the lid, wherein both lid parts can be opened in such a way that transversely to the vehicle traveling direction the respectively one outer lid part and the one inner lid part are located adjacently to each other and raised upwardly at both outer roof edges.

12 Claims, 11 Drawing Sheets

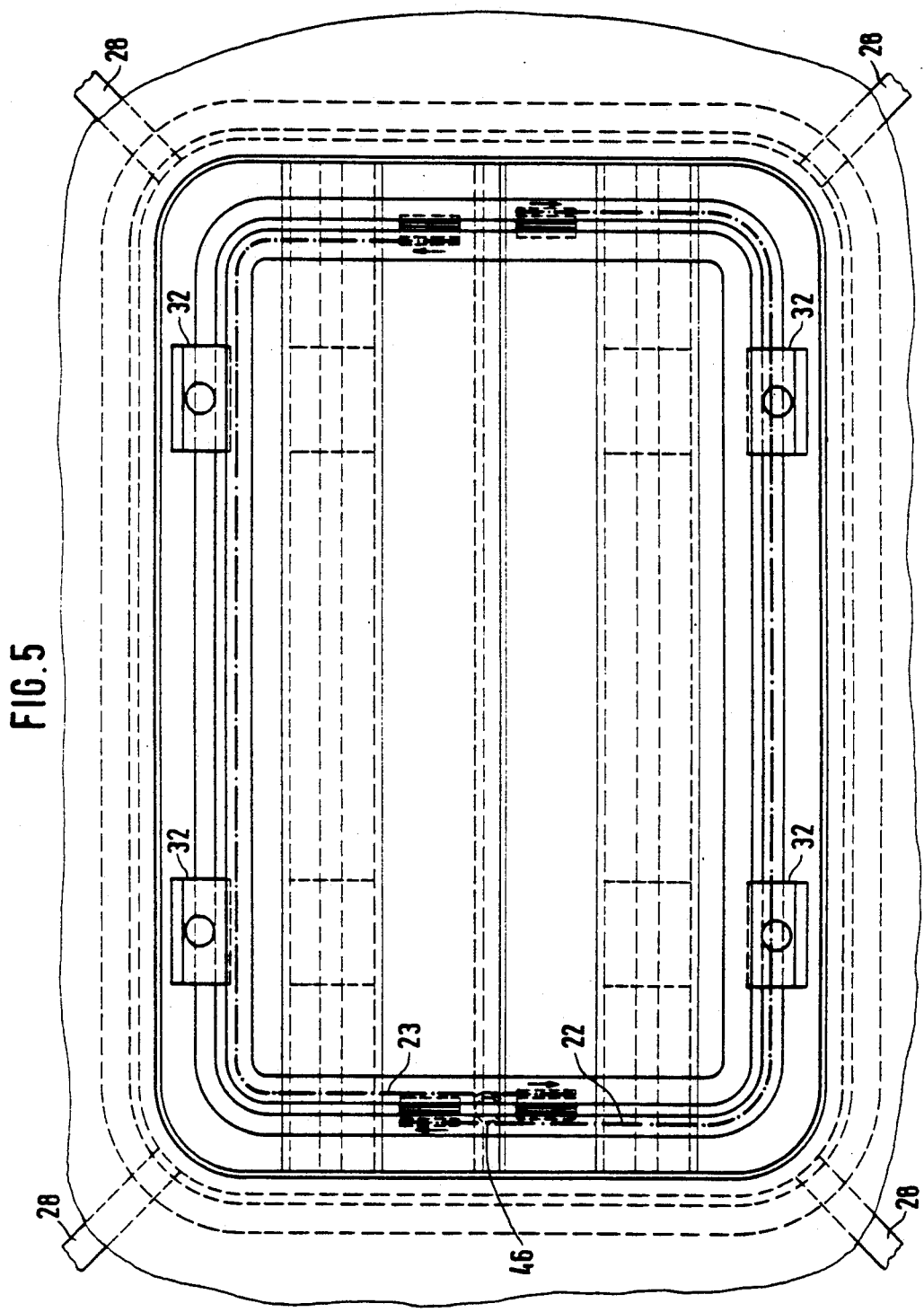

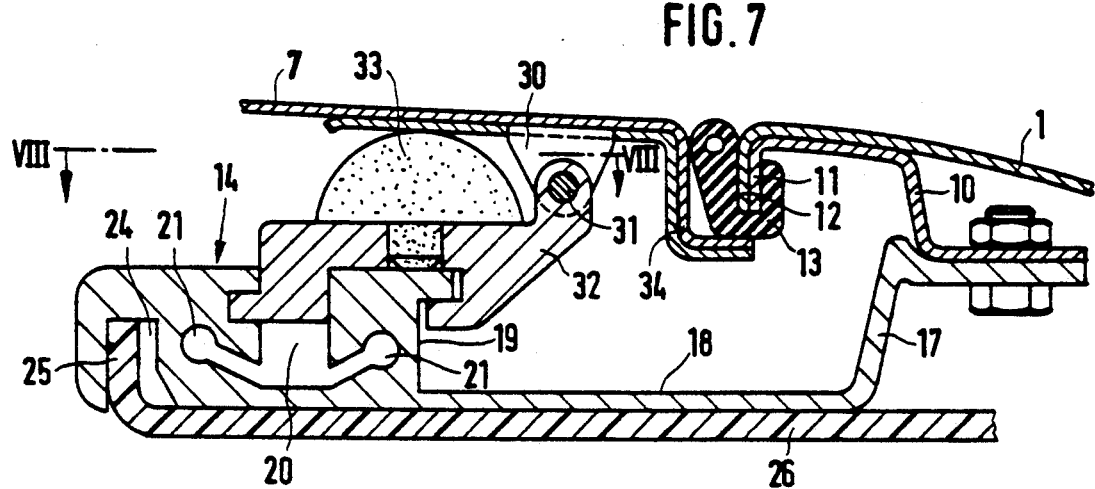
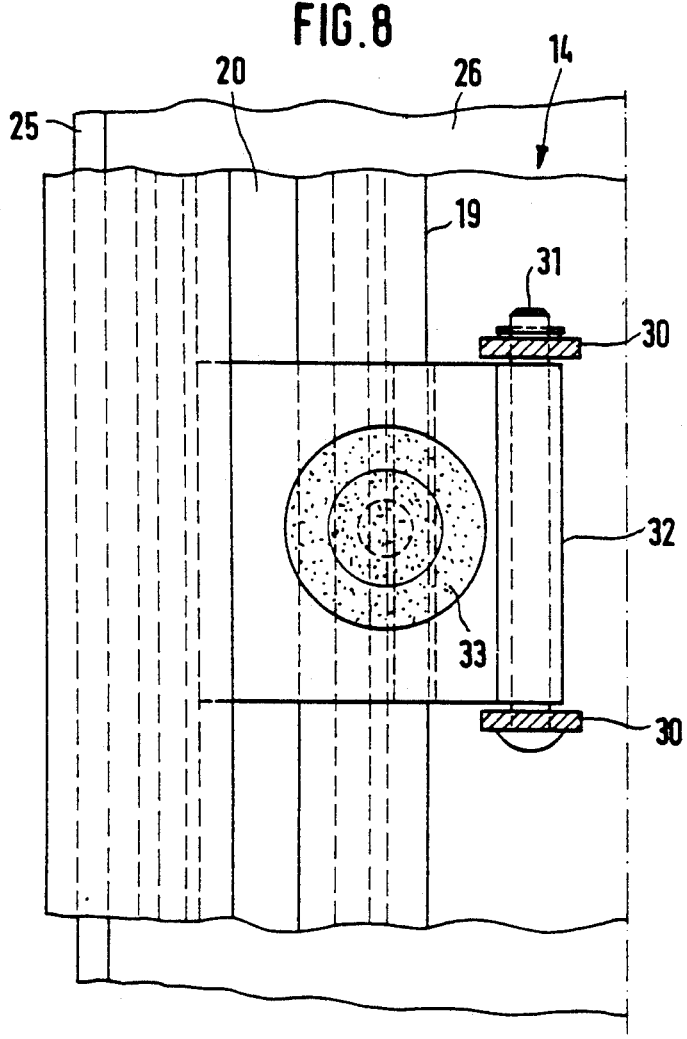

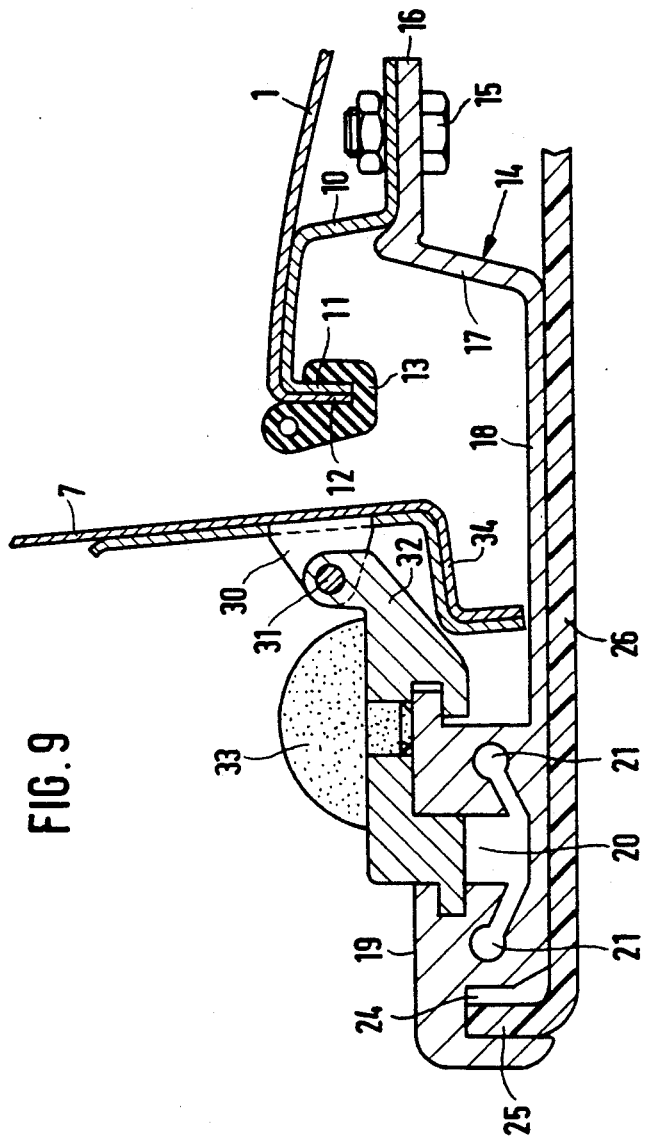
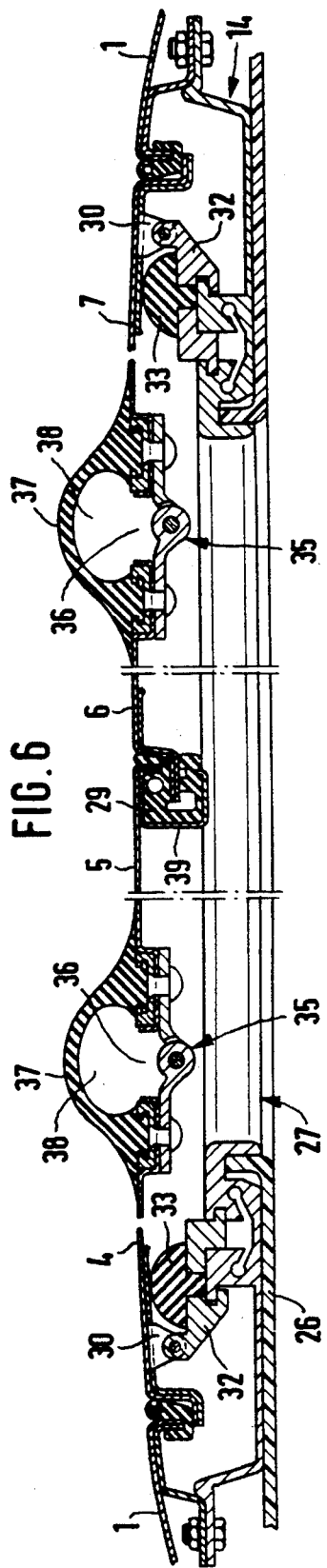
FIG. 9
FIG. 6

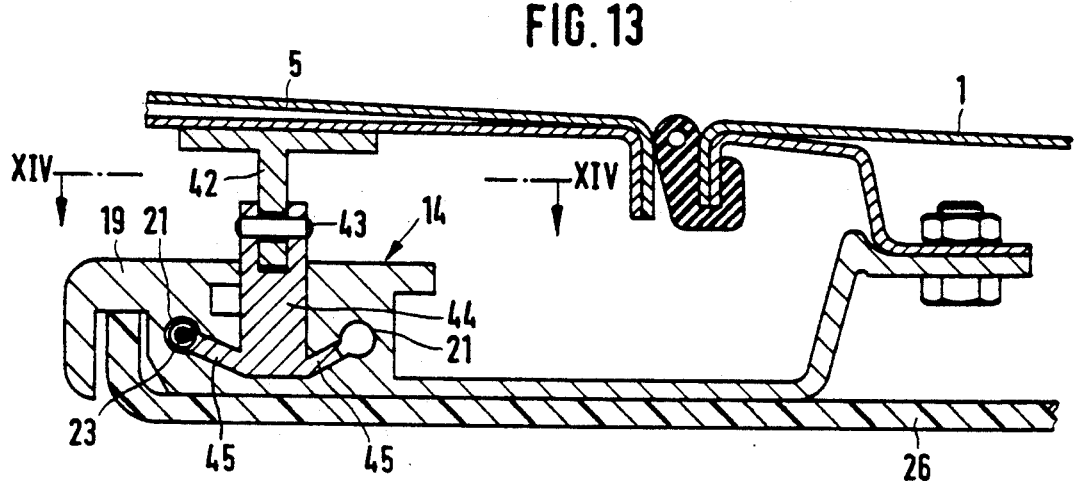
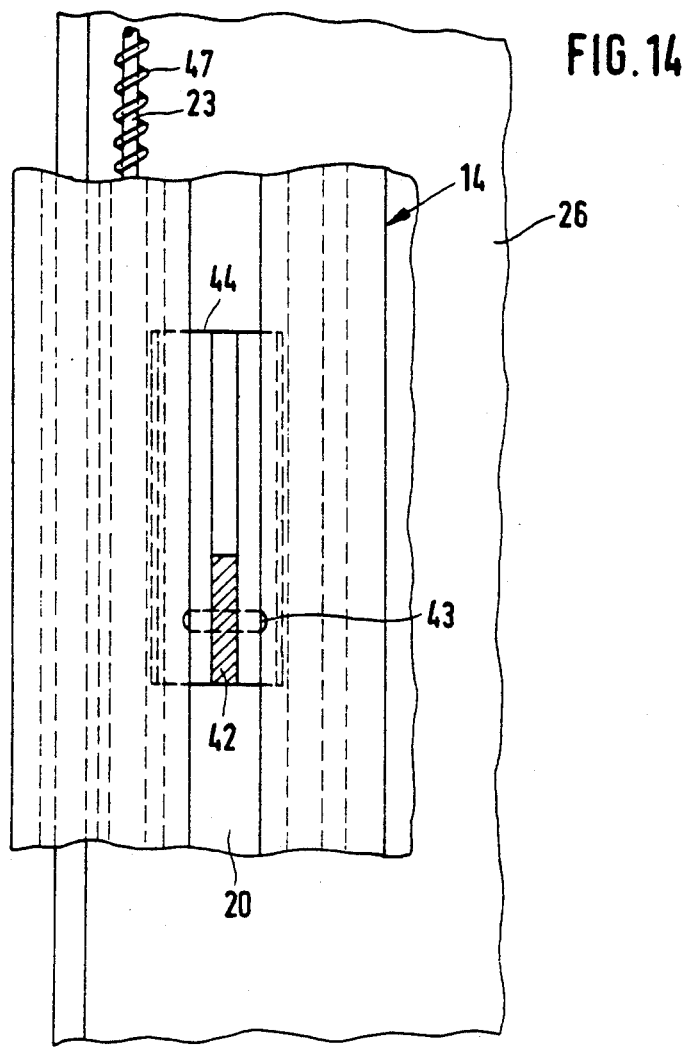

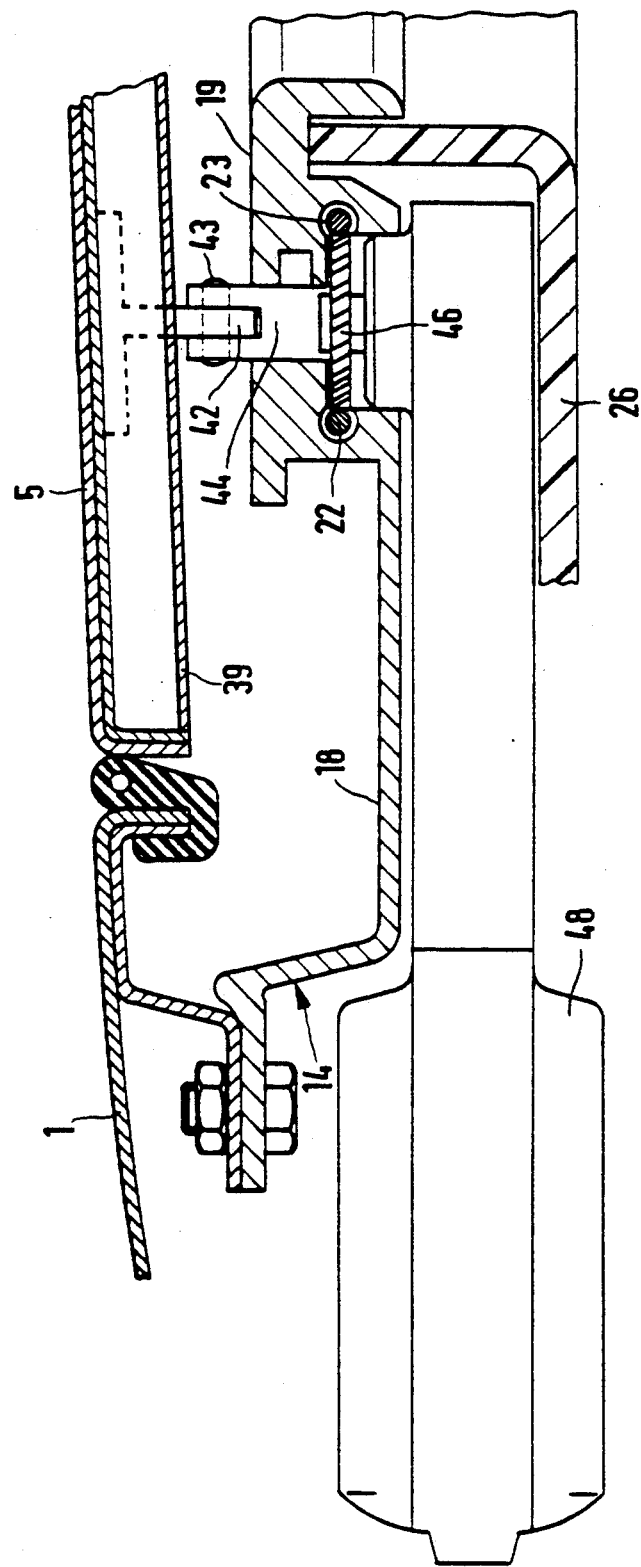

ROOF CONSTRUCTION FOR VEHICLES

This is a continuation of U.S. patent application Ser. No. 07/869,261, filed Apr. 15, 1992 now abandoned.

BACKGROUND OF THE INVENTION

The invention deals with a roof construction for vehicles, including a main body having a roof aperture, a multipart lid assigned to the roof aperture, which lid is moved between a closed position that completely fills the roof aperture and an open position that exposes the roof aperture by pivoting the lid parts outwardly. The lid parts are essentially configured as elongated rectangles that are hinged to one another to form at least one pair so that when folded together upwardly the lid parts are displaceable parallel to oppositely located edges of the roof aperture, the lid parts being displaceably guided on guide rails by means of guide sockets articulated with the lid parts, which guide rails are oriented parallel to the other pair of oppositely located edges of the roof aperture, while being positioned beneath the lid parts being fastened to the main body of the vehicle roof.

Such a vehicle roof is known from PS 639 479, in which the longer sides of the cover or lid part are oriented transversely to the longitudinal axis of the vehicle, so that the roof is open or closed by displacing the lid parts towards the rear or the front on rails extending in the direction of the longitudinal axis. There the lid parts fold to form a package transversely to the longitudinal axis and protruding upwardly, which package generates considerable air resistance when traveling. Furthermore, this package of folded lid part pairs has a number of gaps opened towards the top due to the spacing between the individual folded lid part, pairs, whereby air vortices and with this undesirable wind noises are caused. Because of the transverse arrangement of the lid parts, many lid parts, and long displacement travel of the lid parts linked to each other by articulated arms, are necessary in roof apertures having a considerable length. In addition, the known vehicle roof is to be actuated by pulling or pushing, which complicates the operation. Finally, a seal is provided at one of the lid parts for the purpose of sealing the lid part at each joint, so that sealing with the roof closed depends on the precise edge engagement of the overlapping lid parts and is already locked with a slight dislocation or misalignment of the lid parts to each other.

SUMMARY OF THE INVENTION

Accordingly, it is an object of the present invention to provide roof construction of the above-mentioned type, where the wind resistance and flow noises caused by folding the lids or cover parts together are comparatively slight, where short displacement travels are made possible, and a reliable sealing at the joints of the lid parts is achieved.

Pursuant to this object, and others which will become apparent hereafter, one aspect of the present invention resides in a roof lid made of lid parts with longer sides aligned parallel to the longitudinal axis of the vehicle, and a drive element for displacing the guide sockets on their guide rails, which element engages at least one of the guide sockets. Also, a flexible seating member bridges a gap between the hinged together edges of the lid parts over the entire length of the edges.

In the roof construction pursuant to the invention, all movements of the lid parts occur transversely to the vehicle longitudinal axis, whereby roof parts when driven in an opening direction fold upwardly oriented in the vehicle longitudinal direction and therefore produce only a comparatively slight air resistance with only slight undesirable wind noises in actual traveling operation. The inventive roof construction makes possible the realization of a roof opening or aperture, whose length when viewed in the vehicle longitudinal direction is considerably greater than the width, wherein in spite of that only slight actuation travels are required for opening and closing the roof aperture because of the motion of the lid parts transversely to the vehicle longitudinal direction. If therefore a hand crank is used for moving the lid parts, the closing and opening movements are achievable with few crank revolutions.

The elongated arrangement of the roof aperture and the lid parts assigned to it in the longitudinal direction of the vehicle renders the roof construction per the invention especially suitable for vehicles with correspondingly elongated roof surfaces, especially for so-called large capacity or stretch limousines, mini buses, caravans and the like. In such vehicles, the inventive roof construction permits opening the roof surface above the rare storage space or over additional seat rows, wherein an excellent ventilation and air evacuation is made possible also in vehicles of such a type. The sealing section closing the gap between the hinged edges of lid parts of a pair is fastened in a sealing manner at both edges, so that the gap is also reliably sealed and this is true in every relative position of the lid parts.

In a preferred embodiment of the invention, two pairs of lid parts are provided in an approximately symmetrical arrangement. Herein the two pairs of lid parts are folded to both sides proceeding from the central vehicle longitudinal plane, whereby walls folded towards both sides of the roof aperture parallel to the vehicle longitudinal direction are formed which prevent the wind from entering from the side into the exposed roof aperture. In this way they act as side wind rejectors against air vortices occurring sideways of the vehicle body. The arrangement of the lid parts can alternately also occur in such a way, that they are folded in the direction from one side to the other side of the roof aperture, especially if a one-sided sideways entry of wind into the elongated aperture need not be apprehended or can be tolerated in view of the shape of the body.

In another embodiment of the roof construction, an additional roof aperture can be provided. This additional roof opening or aperture is arranged, when viewed in the driving direction of the vehicle, upstream of the roof aperture located in the rear region of the vehicle roof area. A ventilation latch hinged in front so as to act in the usual wind deflecting manner, which can assume the action of a wind guard as far as the rear roof aperture is concerned, can be assigned to this additional roof aperture. Naturally this ventilation flap can be pivoted or swiveled independently of an actuation of the lid parts assigned to the rear roof aperture.

In order to guide each pair of lid parts, a simple guide is only required for the lid part which is not articulated in the vicinity of the adjacent edge of the roof aperture. If the guide socket or the plurality of guide sockets provided for this purpose at the assigned guide rail or guide rails is or are displaced in the sense of a roof opening, then this displacement already causes the upward folding-together of the two lid parts. Accordingly, the guide sockets are especially suitable for the engagement of drive elements.

The drive elements are two cables each with a helical thread, that are driven in opposite directions and guided at the guide rails in a positive action push-pull manner. A drive pinion engages the helical thread, and the cables respectively engage different guide sockets.

An especially simple assembly of the roof construction which makes available integrated guides for the lid parts is achieved by using a guide frame which has the guide rails as components thereof. The guide frame completely surrounds the roof aperture and bearing blocks are articulated to the lid parts and fastened to the sides of the guide frame to provide pivoting support for the lid. The guide frame thus enables the complete preassembly of a functional roof design, its functional test prior to installation and its simple attachment at the edges of an appropriately prepared roof aperture.

The alignment of the lift parts with the roof closed can be assured in a simple manner by providing stops on the tops of the bearing blocks. The alignment could possibly be also adjusted by attachment of adjustable stops.

In another embodiment, the lid parts can be bent downwards at their edges adjacent to the edges of the roof aperture and are additionally bent outwardly at the edges articulated to the bearing blocks for the purpose of underpinning the adjacent roof aperture edges. The sealing member has a hat-shaped cross-section defining a downwardly open cavity which receives adjacent lid part edges and a hinge eye when the lid parts are folded together.

. In a further embodiment, the inner lid parts of the two pairs of lid parts have facing edges that are shaped to seal in a inter-engaging manner in the closed position with interposition of a profiled sealing strip that is continuous over the entire length of the facing edges. The profiled sealing strip is fastened at one of the edges that face one another, and is provided with a continuous side slot. The other facing edge is bent off in an L-shaped manner so that when the lid is in the closed position a projecting flange of the L-shaped edge engages into the slot.

The last few features discussed serve for securely retaining and sealing the lid parts in the roof aperture when the roof is closed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is the plan view of FIG. 4 with the drive element drawn in heavy dotted-dash lines and the lid part indicated by thin lines;

FIG. 6 is a cross-section along the line VI—VI in FIG. 3, shown in a shortened manner and by way of a cutout;

FIG. 7 is a broken-out and compared to FIG. 6 magnified section through the pivot bearing arrangement of a closed lid part articulated in the vicinity of a roof aperture edge;

FIG. 8 is a broken-out section along the line VIII—VIII in FIG. 7;

FIG. 9 is a section according to FIG. 7, however with the lid part pivoted outwardly;

FIG. 13 is a broken-out section along the line XIII—XIII in FIG. 3;

FIG. 14 is a broken-out section along the lines XIV—XIV in FIG. 13; and

FIG. 15 is a broken-out section along the line XVXV in FIG. 3.

DETAILED DESCRIPTION OF THE PREFERRED EMBODIMENTS

Figure 1:
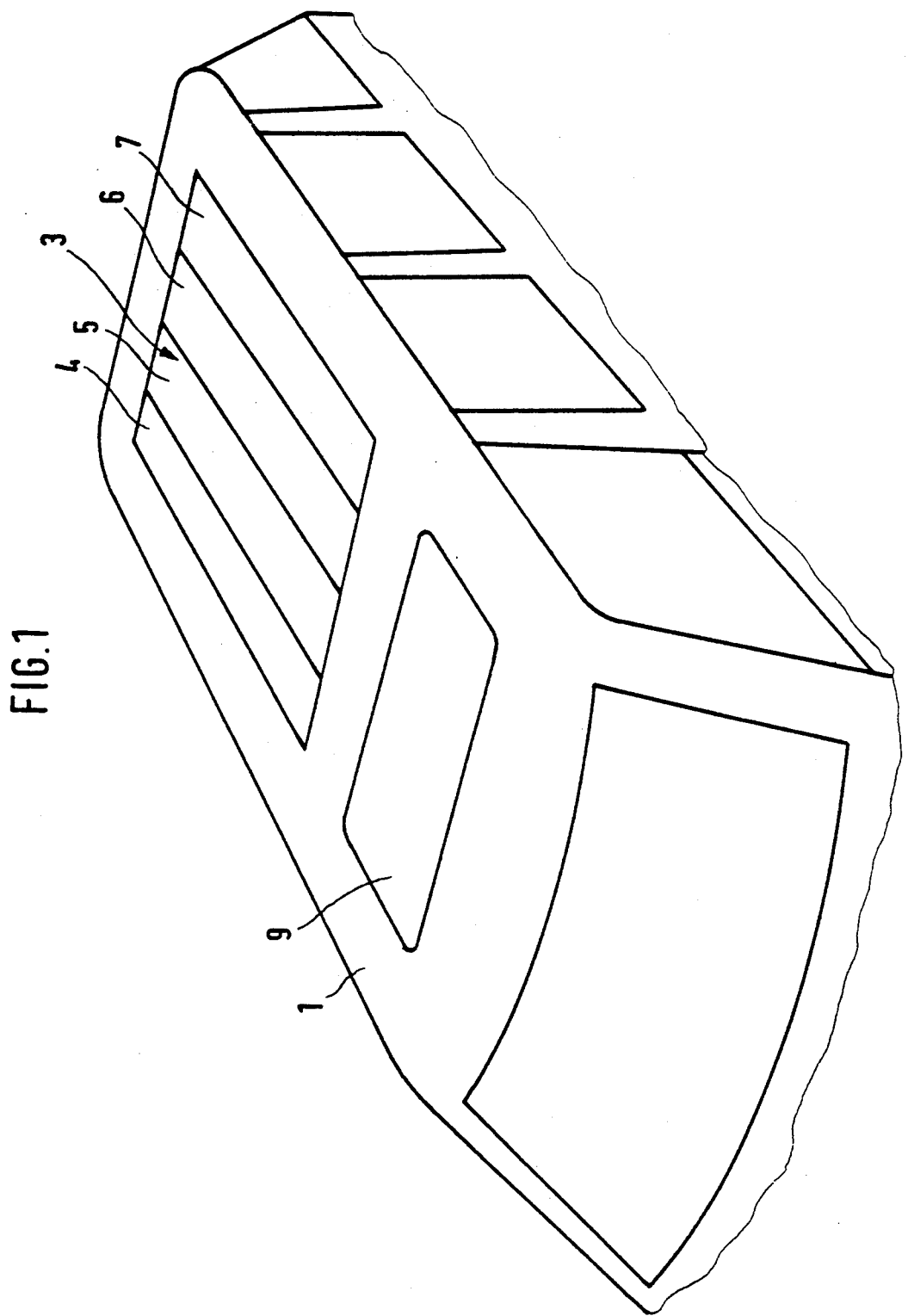
FIG. 1 is a perspective view of a vehicle roof with a separate front ventilation flap and a rear roof aperture closable by two pairs of lid parts, in a closed position of the ventilation flap and the lid parts.
Figure 2:
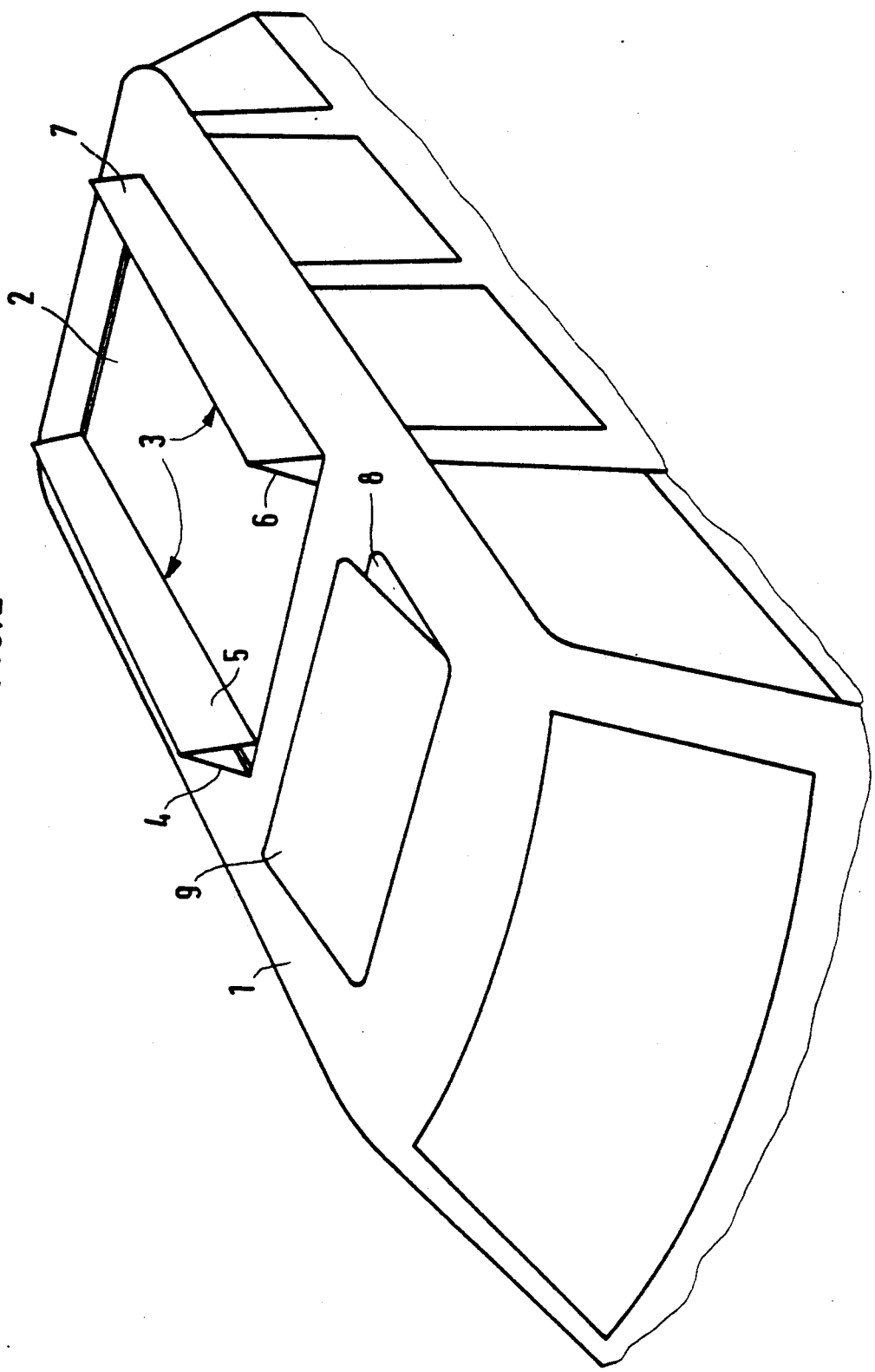
FIG. 2 is a perspective view corresponding to FIG. 1, however with the ventilation flap open, and the rear roof aperture open by folding the pairs of lid parts together.

The roof area of a delivery truck, a stretch limousine or the like shown in FIGS. 1 and 2 comprises in the rear region of the fixed vehicle roof 1 a roof aperture 2 in the form of a rectangle elongated in the traveling direction of the vehicle. A four-part lid 3 is assigned to this first aperture 2, which completely fills the roof aperture 2 in the closed position and essentially exposes the aperture in the open position of the four-part lid 3, as is seen in FIG. 2. The four lid parts of the lid 3 are subdivided into two essentially mirror-image pairs of lid parts 4, 5 and 6, 7.

In the front region of the vehicle roof 1 an additional roof aperture 8 is located that aligns transversely to the vehicle longitudinal axis. A ventilation slab 9 hinged in front and with its rear edge raisable is assigned to the additional aperture 8. The ventilation flap provides an additional ventilation possibility if the front of the motor vehicle and assumes simultaneously the function of a front wind guard or wind barrier for the rear roof aperture 2 if it is exposed. The arrangement of such a known ventilation flap is however an optional measure, which is not mandatory for the roof design described below.

The roof aperture 2 is surrounded on all sides by a reinforcement frame 10, arranged beneath the fixed vehicle roof 1 and connected with a downwardly bent edge 11 with the also downwardly bent edge 12 of the fixed vehicle roof bounding the roof aperture 2, as can for instance be seen from FIGS. 7 and 9. A peripheral edge cap seal 13 is placed from beneath upon the folded-down edges 11, 12.

A single part guide frame 14, manufactured for instance from a continuously extruded section, is fastened on all sides from beneath to the reinforcement frame 10 by bolt connections 15. The four frame portions of the reinforcement frame 10 have an identical cross-section. The outer edge 16 of the guide frame 14 is configured as an attachment flange through which the bolt connections 15 pass. A trough-shaped water conduit 18 follows upon the attachment flange 16 through a web 17 pointing obliquely downwards. The other edge 19 of the water conduit comprises a U-shaped guide channel 20 that opens upwardly, upon which follow in the vicinity of its lower end at both sides cable ducts 21 for the positive push-pull guidance of actuation cables 22 or 23 (FIG. 5). The cable channels or ducts 21 are opened in a slot-shaped manner in the direction of the guide channel 20. The inner edge of the guide frame 14 comprises a groove 24 that opens downwardly, in which the upwardly bent edge 25 of a roof lining 26 is received, which surrounds the aperture 27 (FIG. 6) of the roof lining 26 adjacent to the roof aperture 2. Water drainage or runoff tubes 28 communicating with the water duct 18 are provided at the four corners of the guide rail 14 with the water drainage tube being shown in FIGS. 3 to 5.

The lid or cover 3 formed of four lid parts 4 is arranged within the roof aperture 2. Respectively two lid parts 4, 5 and 6, 7 articulated with each other form one half of the lid, wherein both lid parts can be opened in such a way that transversely to the vehicle traveling direction the respectively one outer lid part 4 or 7 and the one inner lid part 5 or 6 are located adjacently to each other and raised upwardly at both outer roof edges. In the closed state the inner lid parts 5, 6 contact each other in such a way with interposition of a profiled sealing strip 29 (FIG. 6), that the upper surfaces of all lid parts 4 to 7 follow the roof curvature.

In the following description we will essentially deal with only one of the lid halves which are identical in a mirror-image like manner. Herein we mean by "outer lid part" respectively that lid part, which is arranged next to a roof aperture edge. The so designated "inner lid part" follows upon the outer lid part and is arranged pointing toward the roof center.

Figure 3:
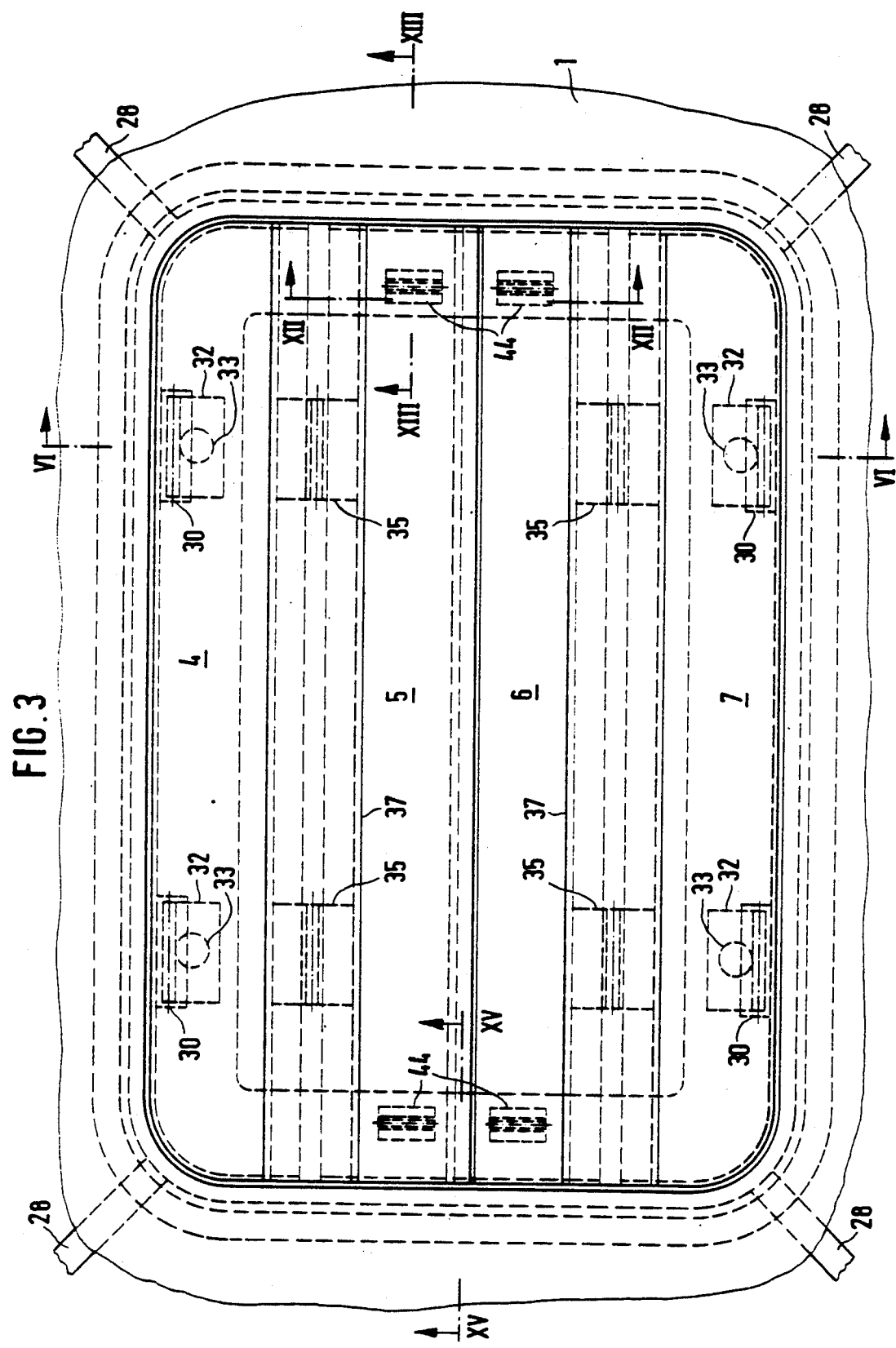
FIG. 3 is a plan view upon the rear region of the vehicle roof with the pairs of lid parts closed.
Figure 4:
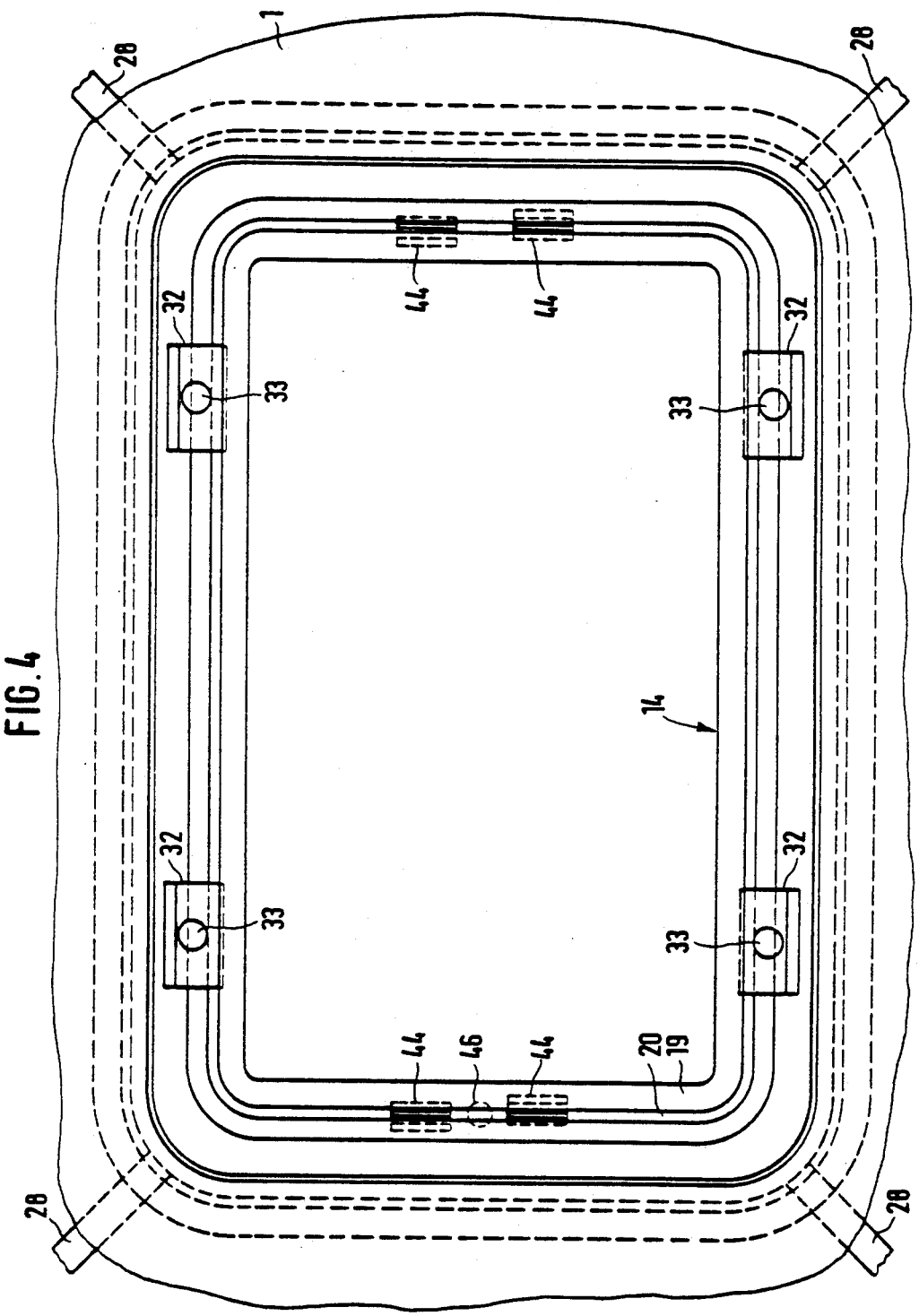
FIG. 4 is the plan view of FIG. 3, however without the lid parts.
Figure 10:
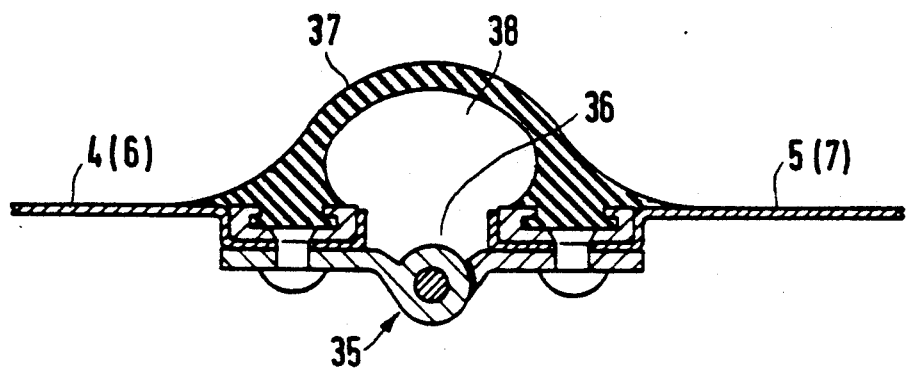
FIG. 10 is a broken-out and compared to FIG. 6 magnified section through the hinge point of two lid parts.
Figure 11:
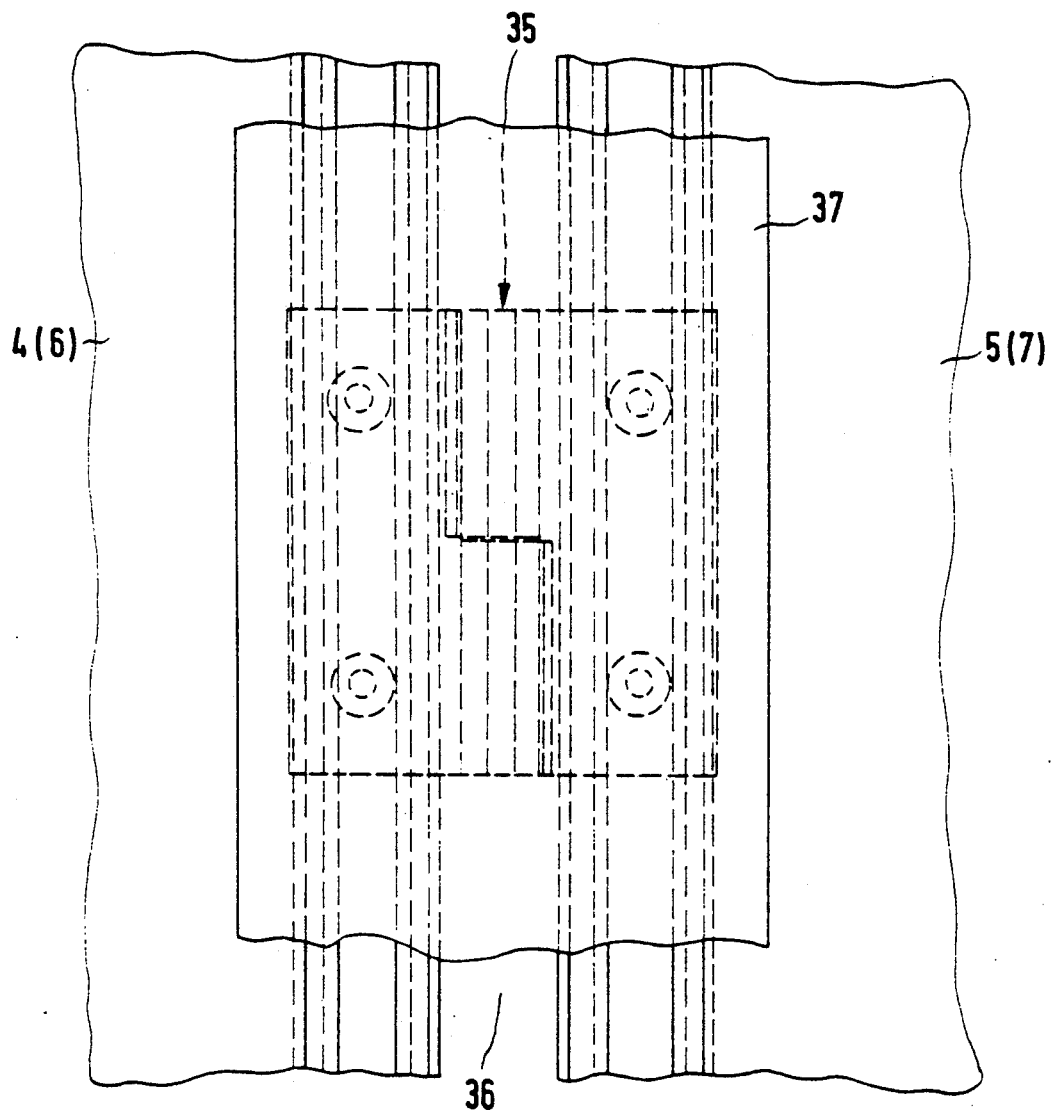
FIG. 11 is a broken-out plan view upon the hinge point in FIG. 10.

The outer lid part 4 (7) is pivotably supported by two bearing fittings 30 fastened thereon through pivot bolts 31 in bearing blocks 32, as it can be seen in FIG. 3 in connection with the FIGS. 6 to 9. The bearing points are in the vicinity of the roof opening edge 12. The bearing blocks 32 are arranged spaced from each other at the thickened edge 19 of the guide frame 14 and are fixed in a suitable manner. The cross-sectional profile of the bearing block 32 is adapted in such a way to the cross-sectional profile of the thickened edge 19, that the bearing block 32 can be slid from the edges of the guide frame 14 through (not shown) slot faced recesses upon the thickened edge 19 in a positively-locking manner and are displaced on said edge 19, until their distance corresponds to the distance or spacing of the bearing brackets 13 at the outer lid part 4 (7).

A stop 33 configured as a mushroom-shaped damper is fastened on a upwardly pointing face of each bearing block 32, with the height of the stop to be dimensioned in such a way that when the outer lid portion comes to rest on it the outer surface of the lid lies flush with the roof transverse curvature.

The edge 34 of the outer lid part 4 (7) adjacent to the roof aperture edge 12 is bent off downward and outward in an L-shaped manner, so that it grips below the edge gap seals 13 with the lid 3 closed (FIG. 7). The inner lid part 5 (6) is fastened pivotably on hinges 35 at the other edge of the outer lid part 4 (7) so that the oppositely located edges form a gap 36 (FIG. 6), which is bridged over by a sealing section 37 across its entire length, which section is respectively fastened to the edges of the lid parts. The flexible sealing section 37, which is a hat-shape in cross-section comprises a cavity 38 open towards the bottom, which upon extension of the two lid parts 4, 5 (6, 7) receives their adjacent edges and the hinge eyes of the hinges 35.

The edge of the inner lid parts 5 that is closest to the central roof longitudinal axis is bent off downwardly and fixably connected with a receiving strip 39 into which a profiled sealing member 29 is slid. The profiled sealing member 29 comprises a slot 40 (FIG. 12) continuous in length, into which, when the lid closed, the inner lid portion 6 lying opposite to the profiled sealing member 29 engages with an edge bent off in an L-shaped manner which for this purpose comprises a projecting flange 41.

T-shaped bearing blocks 42 (FIG. 13) are fastened to the lid parts 5 and 6 in such a way that their free ends point downward and are connected in a positively mobile manner by a bearing trunnion 43 with a guide socket 44. The T-shaped bearing blocks 42 are respectively located at the inner lid parts 5 and 6 and actually at its front and rear ends viewed in the vehicle traveling direction. The bearing blocks 42 are arranged at each inner lid part 5 and 6 in the vicinity of the longitudinal edges of each inner lid part lying opposite one another (FIG. 12).

The guide sockets 44 are displaceably guided at the rear and front transverse parts of the guide frame 14. The lower ends of the guide sockets 44 are designed in such a way, that they protrude with two guide webs 45 into the obliquely extending opening slots of the cable channels 21 of the thickened edge 19 of the guide frame 14 (FIG. 13). The guide webs 45 have a different length. One of the two guide webs 45 protrudes with its free end into one cable channel 21 and is there fixedly connected with the end of an actuation cable 22 or 23 similar to a driver or entrainment means. The other guide web ends in front of the other cable channel 21, is at its free end does not come into contact with the other actuation cable 23 or 22.

Figure 12:
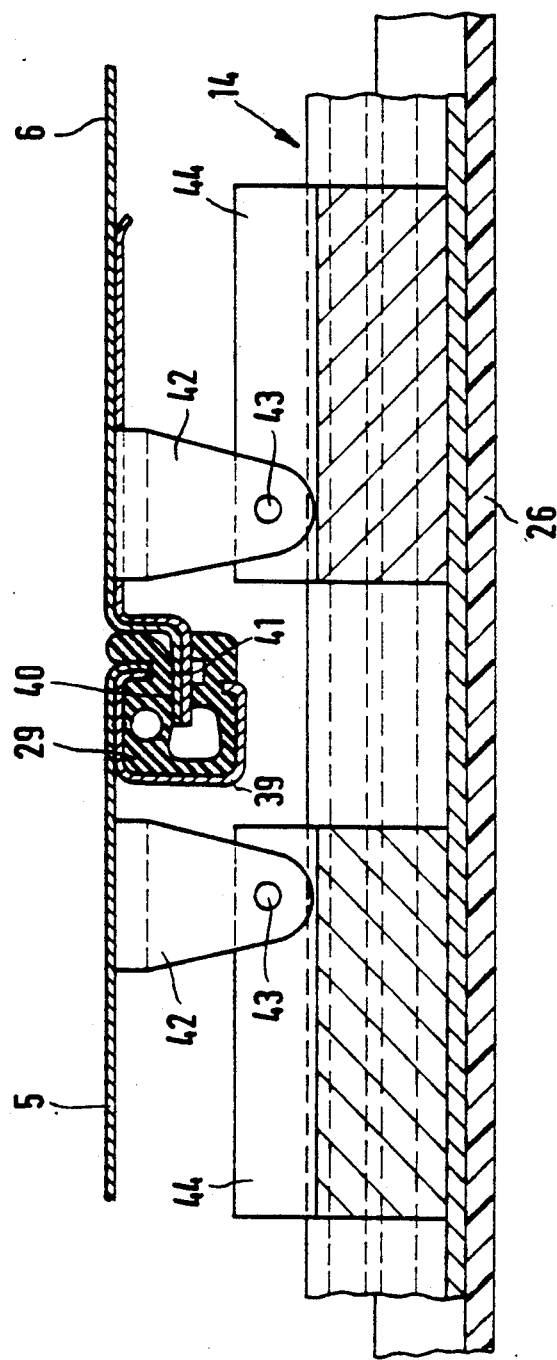
FIG. 12 is a broken-out section along the line XII—XII in FIG. 3.

The guide sockets 44 are placed in the transverse portion of the guide plate 14 in such a way that, with the lid closed, they are spaced opposite each other in the vicinity of the lid longitudinal center, as is shown in FIG. 12. Herein the guide webs 45 connected with the ends of the actuation cable 22, 23 are located respectively in cable channels 21 located opposite each other, as the position of the cables in FIG. 5 illustrates.

The actuation cables 22, 23 are respectively connected at both ends with guide sockets 44 in the manner which has been previously described. Both actuation cables 22, 23 extend proceeding from the front transverse version of the guide frame 10 respectively across the longitudinal part thereof up to approximately the center of the rear transverse portion. The guide sockets 44 of each respective cable are located on different sides referred to the central longitudinal axis of the lid 3, meaning the two drive cables engage respectively with one end at a guide socket of the one inner lid portion and with the other end at the guide socket located diagonally opposite of the other inner lid portion. In the front transverse portion of the guide frame 14 the actuation cables 22, 23 lie opposite each other. A gear pinion 46 (FIG. 5, 15), which forms the power output element of an electrical gear motor 48 (FIG. 15) or a manual drive unit (not shown here), engages at this point into helical threads or windings 47 (FIG. 14) of the two actuation cables 22 and 23. The geared motor or the manual drive unit is fixedly connected with the guide frame 14 to form a single installation unit.

Depending upon the direction of rotation of the pinion 46 the actuation cables 22, 23 are displaced in opposite directions so that during the opening phase of the lid 3 the guide sockets 44 are moved outwardly and during the closing phase inwardly towards the roof center. During the lid opening process the inner lid parts 5 and 6 are displaced in opposite directions to one another by the bearing blocks 42 articulated with the guide sockets 44 and they abut by means of the hinges 35 at the outer lid parts 4 or 7 which in turn abut by means of the bearing blocks 32 at the pivot bolts 31 fixed to the guide frame 14. In this way the lid parts are raised upwardly in pairs in a roof-shaped manner, until the lid part pairs are positioned at the end of the opening process lying next to each other and directed at the respectively outer roof edges. The closing process runs in reverse sequence.

While the invention has been illustrated and described as embodied in a roof construction for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A roof construction for a vehicle, comprising:
   a main body having an elongated rectangular roof aperture which is defined by short edges and long edges;
   a multipart lid assigned to the roof aperture, having pairs of inner and outer lid parts which are movable between a closed position that completely fills the roof aperture and an open position that exposes the roof aperture by pivoting the lid parts outwardly;
   each pair of inner and outer lid parts being essentially configured as a pair of elongated rectangles, each inner lid part being hinged to one of the outer lid parts such that when folded together upwardly each inner lid is located next to a respective one of the outer lid parts, the pair of inner lid parts being coplanar when the inner and outer lid parts are moved to the closed position;
   the inner and outer lid parts being displaceably guided on guide rails by means of guide sockets articulated with the inner lid part, which guide rails are oriented parallel to the oppositely located short edges of the roof aperture, while being positioned beneath the inner and outer lid parts and being fastened to the main body of the vehicle roof, long sides of the inner and outer lid parts being oriented parallel to a vehicle longitudinal axis of the vehicle; and
   drive means for displacing each guide socket on its guide rail, said drive means engaging at least one of the guide sockets, the inner and outer lid parts being connected together in a sealed manner over their entire length at their hinged together edges with a flexible sealing member that bridges a gap between the inner and outer lid parts;
   an edge of one of the inner lid parts that is closest to a central roof longitudinal axis is bent off downwardly and fixably connected with a receiving strip into which a profiled sealing member is slid; and
   the profiled sealing member comprises a slot continuous in length, into which, when the inner and outer lids are in a closed position, the inner lid part lying opposite to the profiled sealing member engages with an edge bent off first downwardly and then toward and into the slot of the profiled sealing member.

2. A roof construction according to claim 1, wherein two pairs of lid parts are provided, each pair of lid parts being a mirror-image of the other, each of the pairs having one of the outer lid parts respectively articulated to a stationary swivel bearing attached in the vicinity of an adjacent edge of the roof aperture.

3. A roof construction according to claim 1, wherein, an additional rectangular roof aperture, aligned with its longer edges transversely to the vehicle longitudinal axis is provided in a front region of the main body of the vehicle roof, a raisable ventilation flap being arranged in the additional roof aperture so as to act as a wind barrier for the rear roof aperture.

4. A roof construction according to claim 2, wherein in each pair of lid parts, the inner part, which is not articulated in the vicinity of the edge of the roof aperture, is connected in the vicinity of its inner edge at least at one of its ends in an articulated manner with one of the guide sockets.

5. A roof construction according to claim 2, wherein the drive means includes two flexible actuation cables with a helical thread and drivable in opposite directions and guided by the guide rails in a positive action push-pull manner, the drive means further including a drive unit having a pinion that engages the helical thread of the cables in a positive, force-transmitting manner, the two actuation cables engaging respectively with different guide sockets (44).

6. A roof construction according to claim 1 wherein the guide rails are components of a guide frame (14) that surrounds the roof aperture on all sides, and further comprising bearing blocks fastened to one side of the guide frame and articulated to the outer lid for the pivoting support of the lid parts.

7. A roof construction according to claim 2, wherein the guide rails are components of a guide frame that surrounds the roof aperture on all sides, and further comprising bearing blocks fastened to opposite sides of the guide frame and articulated to the outer lid parts so as to provide pivoting support for the lid parts.

8. A roof construction according to claim 7, and further comprising upwardly pointed stop members fastened to the bearing blocks so that the lid parts articulated to the bearing blocks rest against the stop members in the closed position flush with the main body of the vehicle roof.

9. A roof construction according to claim 6, wherein the outer lid parts are bent downwards at their edges adjacent to the sides of the roof aperture and are additionally bent outwardly at the edges articulated to the bearing for the purpose of underpinning adjacent roof aperture edges.

10. A roof construction according to claim 7, wherein the outer lid parts are bent downwards at their edges adjacent to the sides of the roof aperture and are additionally bent outwardly at the edges articulated to the bearing for the purpose of underpinning adjacent roof aperture edges.

11. A roof construction according to claim 1, wherein the sealing member has a hat-shaped cross-section defining a downwardly open cavity which covers adjacent lid part edges and a hinge eye when the lid parts are folded together.

12. A roof construction for a vehicle, comprising:
- a main body having an elongated rectangular roof aperture which is defined by short edges and long edges;
- a multipart lid assigned to the roof aperture, having pairs of inner and outer lid parts which are movable between a closed position that completely fills the roof aperture and an open position that exposes the roof aperture by pivoting the lid parts outwardly;
- each pair of inner and outer lid parts being essentially configured as a pair of elongated rectangles, each inner lid part being hinged to one of the outer lid parts such that when folded together upwardly each inner lid is located next to the respective one of the outer lid parts, the pair of inner lid parts being coplanar when the inner and outer lid parts are moved to the closed position;
- the inner and outer lid parts being displaceably guided on guide rails by means of guide sockets articulated with the inner lid part, which guide rails are oriented parallel to the oppositely located short edges of the roof aperture, while being positioned beneath the lid parts and being fastened to the main body of the vehicle roof, long sides of the inner and outer lid parts being oriented parallel to a vehicle longitudinal axis of the vehicle; and
- drive means for displacing each guide socket on its guide rail, said drive means engaging at least one of the guide sockets, the inner and outer lid parts being connected together in a sealed manner over their entire length at their hinged together edges with a flexible sealing member that bridges a gap between the inner and outer lid parts;
- an edge of one of the inner lid parts that is closest to a central roof longitudinal axis is bent off downwardly and fixedly connected with a receiving strip into which a profiled sealing member is slid; and
- the profiled sealing member comprises a slot continuous in length, into which, when the inner and outer lids are in a closed position, the inner lid part lying opposite to the profiled sealing member engages with an edge bent off first downwardly and then toward and into the slot of the profiled sealing member;
- two pairs of inner and outer lid parts are provided, each pair of inner and outer lid parts being a mirror-image of the other, each of the pairs having the outer lid part respectively articulated to a stationary swivel bearing attached in the vicinity of an adjacent edge of the roof aperture, and in the closed position of the lid adjacent edges of the inner lid parts being located next to each other;
- the roof aperture is elongated in the direction of the vehicle longitudinal axis and is located in a rear region of the main body of the vehicle roof, an additional rectangular roof aperture, aligned with its edges transversely to the vehicle longitudinal axis is provided in a front region of the main body of the vehicle roof, a raisable ventilation flap being arranged in the additional roof aperture so as to act as a wind barrier for the rear roof aperture, and in each pair of inner and outer lid parts, the inner part, which is not articulated in the vicinity of the edge of the roof aperture, is connected in the vicinity of its outer edge at least at one of its ends in an articulated manner with one of the guide sockets;
- the drive means includes first and second flexible actuation cables with a helical thread and drivable in opposite directions and guided by the guide rails in a positive action push-pull manner, the drive means further including a drive unit having a pinion that engages the helical thread of the cables in a positive, force-transmitting manner, the first and second actuation cables engaging respectively with different guide sockets (44); and
- the guide sockets are assigned to the inner lid parts adjacent to one another, each of the first and second actuation cables respectively engages at one end with a guide socket of one inner lid part and at the other end with a diagonally opposite guide socket of the other inner lid part.

* * * * *